United States Patent
Borrelli

[11] 3,737,236
[45] June 5, 1973

[54] MAGNETOOPTIC READOUT SYSTEM UTILIZING OPTICAL WAVEGUIDE FIBERS

[75] Inventor: Nicholas F. Borrelli, Elmira, N.Y.
[73] Assignee: Corning Glass Works, Corning, N.Y.
[22] Filed: Jan. 3, 1972
[21] Appl. No.: 214,898

[52] U.S. Cl. ............356/118, 356/114, 356/117, 350/96 WG, 350/175 GN, 250/225, 250/227
[51] Int. Cl. .............................................G01n 21/40
[58] Field of Search..................356/114, 115, 117, 356/118, 119; 350/96 WG, 175 GN; 250/225, 227

[56] References Cited

UNITED STATES PATENTS 3,434,774   3/1969   Miller ........................350/96 WG
3,614,197   10/1971   Nishizawa et al. .............350/175 GN

OTHER PUBLICATIONS

"Magneto-Optical Read-Out System" by Albert et al., IBM Tech. Bltn. Vol. 14, No. 7, Dec. 1971, pg. 2160.
"Magneto-Optical Recording System" by Hagopian, IBM Tech. Bltn., Vol. 3, No. 3, Aug. 1960, pg. 67 & 68.
"Magnetic Properties Test Instrument," by Chang et al., IBM Tech. Bltn., Vol. 8, No. 8, Jan. 1966, pg. 1105-1106.
"Magneto-Optic Hysteresigraph" by Hart, IBM Tech. Bltn., Vol. 1, No. 5, Feb. 1959, pg. 18 & 19.
"Optical Characteristics of a Light-Focusing Fiber Guide, Etc." by Uchida et al., IEEE JQE Vol. QE-6, No. 10, Oct. 1970, pg. 606-612.

Primary Examiner—Ronald L. Wibert
Assistant Examiner—P. K. Godwin
Attorney—Richard E. Kurtz

[57] ABSTRACT

Optical waveguide fibers are utilized in a magnetooptic readout system for magnetic disk file applications to maintain high resolution capabilities of plane polarized light beams. In one type of system, a first waveguide fiber transmits the light beam from a source to a magnetized storage medium and a second waveguide fiber transmits the reflected light beam from the magnetized storage medium to a combination analyzer-detector. The waveguide fibers may be of the self-focusing type with the point of focus being maintained at the magnetized medium. In another type of system, a single waveguide fiber is utilized to transmit the light beam from the source and back to the analyzer-detector. The end of the waveguide fiber adjacent the magnetized medium is coated with a magnetic film having a low coercive field. The light beam is reflected from the film which lies within the flux lines generated by the magnetized medium and undergoes a polarization reversal.

10 Claims, 6 Drawing Figures

MAGNETOOPTIC READOUT SYSTEM UTILIZING OPTICAL WAVEGUIDE FIBERS

BACKGROUND OF THE INVENTION

1. Field of the Invention

This invention relates to systems for the magnetooptic readout of information stored on a magnetized medium.

Magnetooptic readout systems rely upon the following principles. If a plane polarized light beam passes through or is reflected from a ferromagnetic body, the beam will undergo a rotation of the plane of polarization proportional to the magnetization of the body. If the magnetization direction is reversed, the sense of rotation is reversed. Thus in a magnetized storage medium, such as a magnetic disk file, oppositely magnetized regions corresponding to binary bits will be discernible through a crossed polarizer system. In the case of a light beam which is reflected at or in the vicinity of the medium, the angle of rotation $\theta$ results from the Kerr effect and $\theta$ may be expressed as $\theta = KM$ where $K$ is the magnetooptic Kerr constant and $M$ is the magnetization of the surface. In the case of a light beam which is transmitted through the medium, the angle of rotation results from the Faraday effect where now $\theta = VM1$ and where 1 is the optical distance through the material. Typically, rotations due to the Kerr effect are of the order of a few minutes of arc whereas for the Faraday effect the rotation can be as large as a degree depending on the thickness of the storage medium.

The advantage of a magnetooptic readout system arises from the fact that a laser can generate a highly resolved light beam which will permit the readout of magnetic bits stored in a small area. For example, the resolution capability of a focused laser beam is one micron or smaller. At least theoretically, a magnetooptic readout system utilizing a laser should permit readout of information from an extremely high density storage medium.

2. The Prior Art

However, the prior art magnetooptic readout systems are not able to take full advantage of the resolution capability of a focused laser beam. In order to focus the laser beam, the prior art systems utilize lenses, but it is impractical if not impossible to place the lens sufficiently close to a magnetized medium such as a magnetic disk file, to take full advantage of the resolution capabilities of a laser beam. It is of course equally difficult to place mirrors or polarizers sufficiently close to the magnetized medium. Such systems do not therefore lend themselves to readout of bits of information recorded in extremely small areas on a high density storage medium.

SUMMARY OF THE INVENTION

It is an object of this invention to provide a versatile and flexible magnetooptic readout system.

It is a more specific object of this invention to provide a system which is capable of magnetooptic readout of information stored on a high density storage medium without the use of lenses, mirrors or polarizers in the vicintiy of the magnetized medium.

In accordance with these and other objects, a magnetooptic readout system is provided comprising optical waveguide means which extend into close proximity with the magnetized medium so as to maintain a high degree of resolution of a plane polarized light beam at the magnetized medium. The waveguide means provides a transmission path from the source of the light beam to the magnetized medium and a return transmission path from the magnetized medium to a means for determining the rotation of the plane of polarization by the magnetized medium. By providing the optical waveguide means, the source including a focusing lens and a means for determining the rotation of the plane of polarization including an analyzer and a detector may be located large distances from the magnetized medium relative to the size of the area on which a bit of information is stored.

In accordance with one important aspect of the invention, the waveguide may comprise a flexible fiber having a core for transmitting the light beam and cladding surrounding the core. The flexible nature of the fiber permits the waveguide to be twisted or otherwise deformed as required to maintain the fiber in sufficiently close proximity to the magnetized medium.

BRIEF DESCRIPTION OF THE DRAWINGS

These and other objects and aspects of the invention will be further understood from the following description taken in conjunction with the drawings in which.

DETAILED DESCRIPTION OF THE PREFERRED EMBODIMENTS

Figure 1:
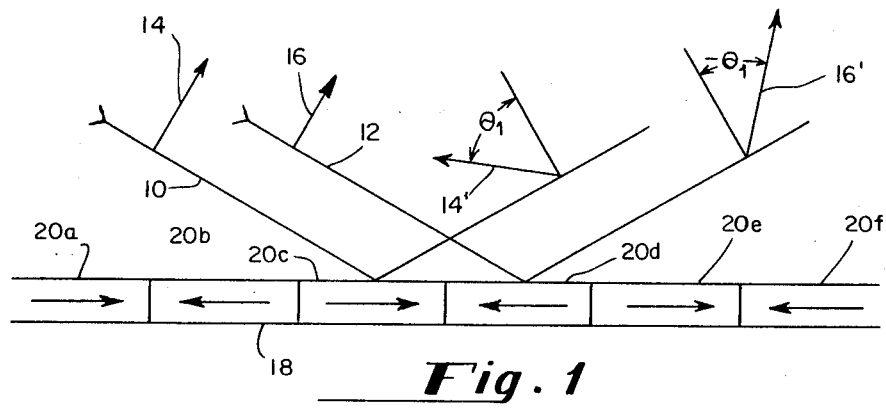
FIG. 1 is a schematic diagram showing the rotation of the plane of polarization by a magnetized medium for two different light beams incident on two different magnetized areas of the magnetized medium.

Referring to FIG. 1, light beams 10 and 12 having planes of polarization 14 and 16 respectively are directed at a magnetized medium 18 having bits of information stored in magnetized areas 20(a-f). The beams 10 and 12 undergo a rotation of their respective planes of polarization 14 and 16 upon reflection from the magnetized medium 18 due to the Kerr effect as represented by the angles $\theta_1$ and $-\theta_1$.

The direction of rotation is dependent upon the direction of magnetization of the particular areas 20 which reflect the beams. In the case of the light beam 10, reflection occurs at magnetized area 20c which is characterized by magnetization generating flux lines in one direction so as to produce an angle of rotation $\theta_1$ and a new plane of polarization 14'. On the other hand, the light beam 12 is incident upon the magnetized area 20d which is characterized by a magnetization generating flux lines in the opposite direction such that the angle of rotation $-\theta_1$ is in the opposite direction to produce a new plane of polarization 16'.

Figure 2:
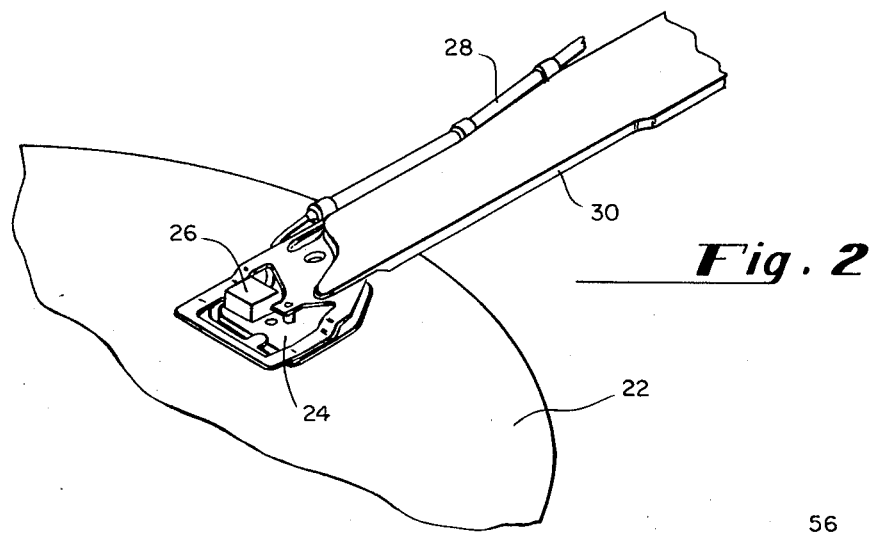
FIG. 2 is a perspective view of a rotating magnetized disk file associated with a flying shoe carrying a magnetooptic readout system.

The array of bits stored at magnetized areas 20(a-f) of the magnetized medium 18 is characteristic of a rotating magnetic disk file 22 shown in FIG. 2. These individual bits are read with a flying shoe 24 shown as overlying the disk 22. The flying shoe 24 carries a magnetooptic readout system within a small capsule 26 which communicates with the disk 22 through a small opening (not shown) in the shoe 24 lying beneath the capsule 26. The readout signals are generated by the magnetooptic system and transmitted through a lead 28 extending along an arm 30. This invention is concerned with an improved magnetooptic readout system of a type which may be incorporated within the capsule 26.

Figure 3:
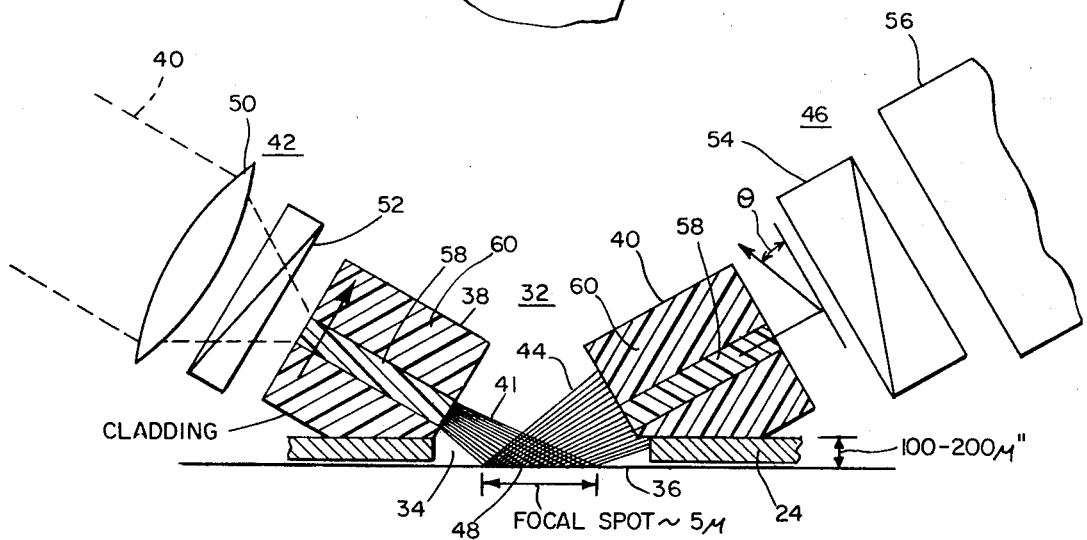
FIG. 3 is a schematic diagram of one embodiment of the invention.

As shown in FIG. 3, a cross polarized magnetooptic readout system 32 which embodies this invention is mounted on the flying shoe 24 at an opening 34 which communicates with a surface 36 of the rotating disk 22. In accordance with this invention, optical waveguide means comprising an input fiber 38 and a pickup fiber 40 are utilized to maintain the resolution of the plane polarized input beam 41 from a source 42 as well as the plane polarized output beam 44 which is transmitted to means 46 for determining the angle of plane rotation $\theta$ due to the magnetization at the focal spot 48 (exaggerated in size) on the magnetized medium 36.

The source 42 which generates a light beam in the $HE_{11}$ mode or any other mode that preserves a plane polarization direction may comprise a laser, not shown, a focusing lens 50, and a polarizer 52. The means 46 for determining the angle of rotation $\theta$ comprises an analyzer 54 and a detector 56 which are well known in the art. A recollimating lens may be utilized between the end of the fiber 40 and the analyzer 54.

Fibers 38 and 40 of the type disclosed in copending applications, Ser. Nos. 36,267 and 36,109, filed May 11, 1970, which are incorporated herein by reference, can achieve a focal spot of 1 to 10 microns and will not alter the plane of polarization of a light beam. Assuming a core 58 having a 1-micron diameter and a spacing between the magnetized surface 36 and the fibers 38 and 40 of 100 to 200 microns, a focal spot of 5 microns may be achieved. Of course the source 42 and means 46 are a much larger distance from the surface 36 than 100 to 200 microns. Thus it will be seen that a bit of information stored on a very limited area at the focal spot 48 may be read out where the source 42 of the plane polarized light and the means 46 for determining the angle of rotation produced by the magnetized surface 36 are located a large distance from the magnetized surface 36 relative to the size of the limited area.

The fibers 38 and 40, as described in the aforesaid copending applications comprise a cladding 60 surrounding the core 58 where the overall fiber diameter may be approximately 5 mills. Since such a fiber is flexible and may therefore be twisted or otherwise deformed, the fiber is particularly well suited for use in a magnetooptic readout system where rather close spacings between the magnetized surface 36 and the fiber are required. Fibers such as those shown in U.S. Pat. No. 2,825,260 — O'Brien which is also incorporated herein by reference are also suitable.

A moderate power laser may be utilized as a source of light. Model 124 laser manufactured by Spectra Physics is particularly well suited for use in this system.

Figure 4:
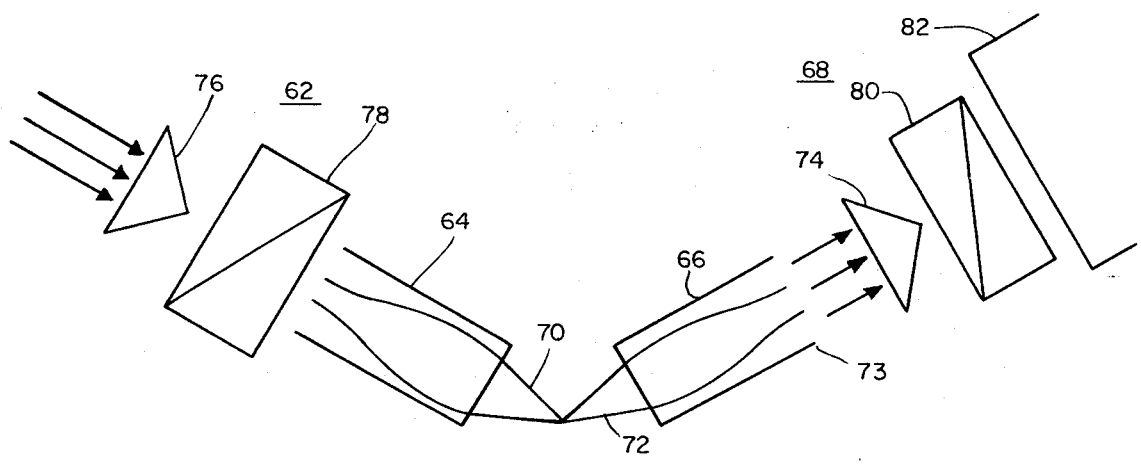
FIG. 4 is a schematic diagram of another embodiment of the invention.
Figure 5:
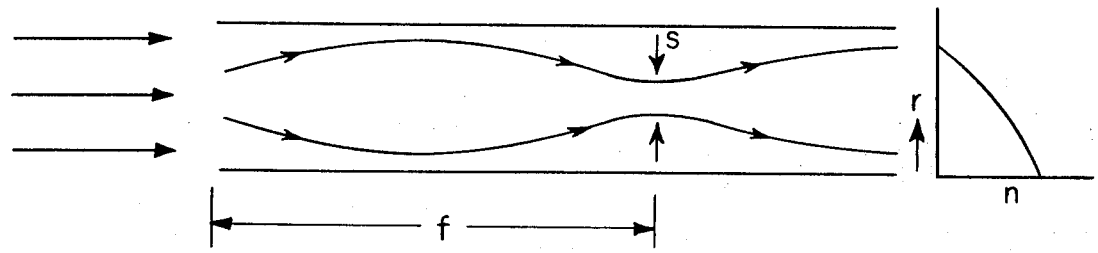
FIG. 5 is a schematic diagram displaying the focusing properties of the waveguides utilized in the embodiment of FIG. 4.

Another embodiment of the invention will now be described with reference to FIGS. 4 and 5. The system is similar to that previously described with reference to FIG. 3 in that it comprises a source 62 of a plane polarized light beam, an input fiber 64 for directing a highly resolved plane polarized light beam at a magnetized medium not shown, a pickup fiber 66 for collecting light reflected from the magnetized medium and a means 68 for determining the rotation of the plane of polarization by the magnetized medium. However, in the system shown in FIG. 4, the fibers 64 and 66 have a self-focusing property. This not only assures a sufficiently small focal point for the input beam 70 at the magnetized medium, it also assures an efficient collection of the light beam reflected from the magnetized medium if the output fiber 66 is placed a focal distance away from the magnetized medium. Thus it will be seen that the end 73 of the output fiber 66 is located one focal length ($f$) from the focal point 48 where the focal length $f$ is defined in FIG. 5 as the distance between focus points $s$. As also shown in FIG. 5, the specific index profile $n$ in a radial direction $r$ continually brings the beam to a focus at points $s$ which are separated by focal lengths $f$. Such an optical waveguide fiber is manufactured and sold under the name Selfoc by Nippon Selfoc Co., Ltd.

The source 62 of the plane polarized light beam includes a laser not shown plus a lens 76 and a polarizer 78. The means for determining the rotation of the plane of polarization includes a recollimating lens 74 plus an analyzer 80 and a detector 82.

Figure 6:
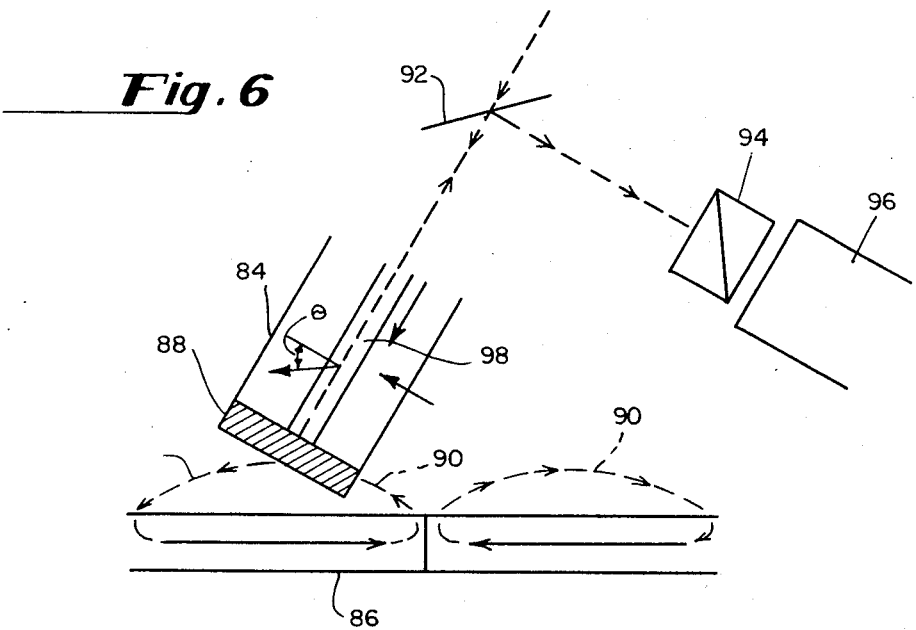
FIG. 6 is a schematic diagram of another embodiment of the invention.

In the embodiment shown in FIG. 6, a single optical waveguide fiber 84 is provided. The end of the fiber 84 adjacent a magnetized medium 86 is coated with a metallic film 88 having a low coercive field such as iron or nickel. Since the film 88 lies in the flux line 90 generated by the magnetized medium 86, the light beam which passes through a beam splitter 92 will undergo a rotation of the plane of polarization upon reflection from the film 88. The reflected light beam then passes from beam splitter 92 to an analyzer 94 and a detector 96 to determine the rotation of the plane of polarization. Of course, that rotation will differ for the two magnetized areas shown in FIG. 6 since the direction of magnetization is opposite. The use of a single fiber in the embodiment of FIG. 6 is particularly advantageous since high light efficiency is obtained using the full resolution of the diameter of the core 98.

In the systems described in the foregoing, the light beam has been reflected from the magnetized medium. It is however possible to transmit the light beam through the medium and detect the light beam after it has undergone a rotation of the plane of polarization. The rotation of the plane of polarization would be the result of the Faraday effect. In such a system, the geometry characteristic of the previously described embodiments would be used, i.e., the waveguide fibers would be inclined with respect to the magnetized medium.

Although particular embodiments have been shown and described in the foregoing specification, it will be understood that various modifications may be made in these embodiments which will fall within the spirit and scope of the invention as set forth in the appended claims.

What is claimed is:

1. A system for the magnetooptic readout of information stored on a magnetized medium comprising:
   a source of a plane polarized light beam directed toward said magnetized medium, the plane of polarization being rotated in response to the magnetization representing the information stored on said magnetized medium;

a means for determining the rotation of said plane of polarization upon receiving said light beam from said magnetized medium; and an optical wave guide means positioned in the path between said source and said means for determining the rotation of said plane of polarization, said wave guide maintaining the resolution of said light beam to permit readout of said stored information.

2. The system of claim 1 wherein said wave guide means comprises a fiber having a core for transmitting said light beam and cladding surrounding said core.

3. The system of claim 2 wherein said wave guide means does not alter the plane of polarization of said light beam.

4. The system of claim 2 wherein said optical wave guide means comprises a first wave guide extending from said source substantially to said magnetized medium and a second wave guide extending substantially from said magnetized medium to said means for determining the rotation of said plane of polarization.

5. The system of claim 4 wherein said first wave guide and said second wave guide are of the self-focusing type having a refractive index profile in the radial direction such that the light is continually being brought to a focus within said first wave guide and said second wave guide, the end of said first wave guide adjacent said magnetized medium being spaced from said magnetized medium so as to focus said beam on said medium.

6. The system of claim 2 wherein said wave guide means comprises a single wave guide coated at the end adjacent said magnetized medium with a magnetic film having a low coercive field, said film lying within the flux lines of said magnetized medium, said light beam traveling through said wave guide toward said magnetized medium, being reflected by said film, and traveling through said wave guide away from said film, the plane of polarization of said light beam being rotated at said film under the influence of said flux lines.

7. The system of claim 6 further comprising a beam splitter located at the end of said wave guide remote from said magnetized medium, said beam splitter separating the portion of said light beam traveling to said film from the portion of said light beam reflected by and traveling from said film.

8. A system for the magnetooptic readout of a bit of information stored on a limited area of a magnetized surface, said system comprising:

a source including a focusing lens of a plane polarized light beam directed toward said magnetized surface, said source being located a large distance from said magnetic surface relative to the size of said limited area;

a means including an analyzer and a detector for determining the rotation of said plane of polarization of said light beam after said beam has passed through the magnetic flux lines in the vicinity of said limited area on said magnetic surface, said means receiving said beam in a highly resolved state a large distance from said magnetized surface relative to the size of said limited area; and an optical wave guide means extending along the path of said light beam from said source, through said flux lines, and to said means for determining the rotation of said polarization, said wave guide means maintaining a high degree of resolution of said light beam without altering the plane of polarization.

9. The system of claim 8 wherein said wave guide means comprises a core surrounded by cladding, said core having a cross sectional area at least as small as said limited area.

10. The system of claim 8 wherein the distance between said wave guide means and said magnetized surface is small relative to the distance between said source and said magnetized surface and relative to the distance between said means for determining the rotation of said plane of polarization and said magnetized surface.

* * * * *